US008548170B2

(12) United States Patent
Ahuja et al.

(10) Patent No.: US 8,548,170 B2
(45) Date of Patent: Oct. 1, 2013

(54) DOCUMENT DE-REGISTRATION

(75) Inventors: Ratinder Paul Singh Ahuja, Saratoga, CA (US); Matthew Howard, Saratoga, CA (US); Rick Lowe, Menlo Park, CA (US); Erik de la Iglesia, Mountain View, CA (US); William Deninger, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 1634 days.

(21) Appl. No.: 10/854,005

(22) Filed: May 25, 2004

(65) Prior Publication Data
US 2005/0132198 A1 Jun. 16, 2005

Related U.S. Application Data

(60) Provisional application No. 60/528,631, filed on Dec. 10, 2003.

(51) Int. Cl.
*H04K 1/00* (2006.01)

(52) U.S. Cl.
USPC ........... 380/258; 380/255; 713/155; 713/156; 713/157; 713/158; 713/159; 726/1; 726/2; 726/22; 726/26; 726/34; 705/67

(58) Field of Classification Search
USPC ................. 713/189, 155–159; 380/258, 255; 726/1–36; 705/67
See application file for complete search history.

(56) References Cited

U.S. PATENT DOCUMENTS

| 4,286,255 | A | * | 8/1981 | Siy .................................. 382/123 |
| 4,710,957 | A | | 12/1987 | Bocci et al. |
| 5,249,289 | A | | 9/1993 | Thamm et al. |
| 5,465,299 | A | | 11/1995 | Matsumoto et al. |
| 5,479,654 | A | | 12/1995 | Squibb |
| 5,497,489 | A | | 3/1996 | Menne |
| 5,542,090 | A | | 7/1996 | Henderson et al. |
| 5,557,747 | A | | 9/1996 | Rogers et al. |

(Continued)

FOREIGN PATENT DOCUMENTS

| EP | 2499806 | 9/2012 |
| WO | WO 2004/008310 | 1/2004 |
| WO | WO 2012/060892 | 5/2012 |

OTHER PUBLICATIONS

"Computer program product for analyzing network traffic", Ethereal. Computer program product for analyzing network traffic, pp. 17-26. http://web.archive.org/web/20030315045117/www.ethereal.com/distribution/docs/user-guide.

(Continued)

*Primary Examiner* — Edan Orgad
*Assistant Examiner* — Roderick Tolentino
(74) *Attorney, Agent, or Firm* — Patent Capital Group

(57) ABSTRACT

A document accessible over a network can be registered. A registered document, and the content contained therein, cannot be transmitted undetected over and off of the network. In one embodiment, a plurality of stored signatures are maintained in a signature database, each signature being associated with one of a plurality of registered documents. In one embodiment, the signature database is maintained by de-registering documents by removing the signatures associated with de-registered documents. In one embodiment, the database is maintained by removing redundant and high detection rate signatures. In one embodiment, the signature database is maintained by removing signatures based on the source text used to generate the signature.

32 Claims, 11 Drawing Sheets

(56) References Cited

U.S. PATENT DOCUMENTS

| | | | |
|---|---|---|---|
| 5,623,652 | A | 4/1997 | Vora et al. |
| 5,768,578 | A | 6/1998 | Kirk |
| 5,781,629 | A | 7/1998 | Haber et al. |
| 5,787,232 | A | 7/1998 | Greiner et al. |
| 5,794,052 | A | 8/1998 | Harding |
| 5,813,009 | A | 9/1998 | Johnson et al. |
| 5,873,081 | A | 2/1999 | Harel |
| 5,937,422 | A | 8/1999 | Nelson et al. |
| 5,943,670 | A | 8/1999 | Prager |
| 5,987,610 | A | 11/1999 | Franczek et al. |
| 5,995,111 | A | 11/1999 | Morioka et al. |
| 6,026,411 | A | 2/2000 | Delp |
| 6,073,142 | A | 6/2000 | Geiger et al. |
| 6,078,953 | A | 6/2000 | Vaid et al. |
| 6,094,531 | A | 7/2000 | Allison et al. |
| 6,108,697 | A | 8/2000 | Raymond et al. |
| 6,122,379 | A | 9/2000 | Barbir |
| 6,161,102 | A | 12/2000 | Yanagihara et al. |
| 6,175,867 | B1 | 1/2001 | Taghadoss |
| 6,192,472 | B1 | 2/2001 | Garay et al. |
| 6,243,091 | B1 | 6/2001 | Berstis |
| 6,243,720 | B1 | 6/2001 | Munter et al. |
| 6,278,992 | B1 | 8/2001 | Curtis et al. |
| 6,292,810 | B1 | 9/2001 | Richards |
| 6,336,186 | B1* | 1/2002 | Dyksterhouse et al. ...... 713/156 |
| 6,343,376 | B1 | 1/2002 | Saxe et al. |
| 6,356,885 | B2 | 3/2002 | Ross et al. |
| 6,363,488 | B1 | 3/2002 | Ginter et al. |
| 6,389,405 | B1 | 5/2002 | Oatman et al. |
| 6,389,419 | B1 | 5/2002 | Wong et al. |
| 6,408,294 | B1 | 6/2002 | Getchius et al. |
| 6,408,301 | B1 | 6/2002 | Patton et al. |
| 6,411,952 | B1 | 6/2002 | Bhrat et al. |
| 6,457,017 | B2 | 9/2002 | Watkins et al. |
| 6,460,050 | B1 | 10/2002 | Pace et al. |
| 6,493,761 | B1 | 12/2002 | Baker et al. |
| 6,499,105 | B1 | 12/2002 | Yoshiura et al. |
| 6,502,091 | B1 | 12/2002 | Chundi et al. |
| 6,515,681 | B1 | 2/2003 | Knight |
| 6,516,320 | B1 | 2/2003 | Odom et al. |
| 6,523,026 | B1 | 2/2003 | Gillis |
| 6,556,964 | B2 | 4/2003 | Haug et al. |
| 6,556,983 | B1 | 4/2003 | Altschuler et al. |
| 6,571,275 | B1 | 5/2003 | Dong et al. |
| 6,584,458 | B1 | 6/2003 | Millett et al. |
| 6,598,033 | B2 | 7/2003 | Ross et al. |
| 6,629,097 | B1 | 9/2003 | Keith |
| 6,662,176 | B2 | 12/2003 | Brunet et al. |
| 6,665,662 | B1 | 12/2003 | Kirkwood et al. |
| 6,675,159 | B1 | 1/2004 | Lin et al. |
| 6,691,209 | B1 | 2/2004 | O'Connell |
| 6,754,647 | B1 | 6/2004 | Tackett et al. |
| 6,757,646 | B2 | 6/2004 | Marchisio |
| 6,771,595 | B1 | 8/2004 | Gilbert et al. |
| 6,772,214 | B1 | 8/2004 | McClain et al. |
| 6,785,815 | B1 | 8/2004 | Serret-Avila et al. |
| 6,804,627 | B1 | 10/2004 | Marokhovsky et al. |
| 6,820,082 | B1 | 11/2004 | Cook et al. |
| 6,857,011 | B2 | 2/2005 | Reinke |
| 6,937,257 | B1 | 8/2005 | Dunlavey |
| 6,950,864 | B1 | 9/2005 | Tsuchiya |
| 6,976,053 | B1 | 12/2005 | Tripp et al. |
| 6,978,297 | B1 | 12/2005 | Piersol |
| 6,978,367 | B1 | 12/2005 | Hind et al. |
| 7,007,020 | B1 | 2/2006 | Chen et al. |
| 7,020,654 | B1 | 3/2006 | Najmi |
| 7,020,661 | B1 | 3/2006 | Cruanes et al. |
| 7,062,572 | B1 | 6/2006 | Hampton |
| 7,072,967 | B1 | 7/2006 | Saulpaugh et al. |
| 7,082,443 | B1 | 7/2006 | Ashby |
| 7,093,288 | B1 | 8/2006 | Hydrie et al. |
| 7,158,983 | B2 | 1/2007 | Willse et al. |
| 7,185,073 | B1 | 2/2007 | Gai et al. |
| 7,185,192 | B1 | 2/2007 | Kahn |
| 7,194,483 | B1 | 3/2007 | Mohan et al. |
| 7,219,131 | B2 | 5/2007 | Banister et al. |
| 7,243,120 | B2 | 7/2007 | Massey |
| 7,246,236 | B2* | 7/2007 | Stirbu .......................... 713/168 |
| 7,254,562 | B2 | 8/2007 | Hsu et al. |
| 7,254,632 | B2 | 8/2007 | Zeira et al. |
| 7,266,845 | B2* | 9/2007 | Hypponen ...................... 726/24 |
| 7,272,724 | B2 | 9/2007 | Tarbotton et al. |
| 7,277,957 | B2 | 10/2007 | Rowley et al. |
| 7,290,048 | B1 | 10/2007 | Barnett et al. |
| 7,293,067 | B1 | 11/2007 | Maki et al. |
| 7,293,238 | B1 | 11/2007 | Brook et al. |
| 7,296,011 | B2 | 11/2007 | Chaudhuri et al. |
| 7,296,070 | B2 | 11/2007 | Sweeney et al. |
| 7,296,088 | B1 | 11/2007 | Padmanabhan et al. |
| 7,296,232 | B1 | 11/2007 | Burdick et al. |
| 7,299,277 | B1 | 11/2007 | Moran et al. |
| 7,373,500 | B2 | 5/2008 | Ramelson et al. |
| 7,424,744 | B1 | 9/2008 | Wu et al. |
| 7,426,181 | B1 | 9/2008 | Feroz et al. |
| 7,434,058 | B2 | 10/2008 | Ahuja et al. |
| 7,467,202 | B2 | 12/2008 | Savchuk |
| 7,477,780 | B2 | 1/2009 | Boncyk et al. |
| 7,483,916 | B2 | 1/2009 | Lowe et al. |
| 7,493,659 | B1 | 2/2009 | Wu et al. |
| 7,505,463 | B2 | 3/2009 | Schuba et al. |
| 7,506,055 | B2 | 3/2009 | McClain et al. |
| 7,506,155 | B1 | 3/2009 | Stewart et al. |
| 7,509,677 | B2 | 3/2009 | Saurabh et al. |
| 7,516,492 | B1 | 4/2009 | Nisbet et al. |
| 7,539,683 | B1 | 5/2009 | Satoh et al. |
| 7,551,629 | B2 | 6/2009 | Chen et al. |
| 7,577,154 | B1 | 8/2009 | Yung et al. |
| 7,581,059 | B2 | 8/2009 | Gupta et al. |
| 7,596,571 | B2 | 9/2009 | Sifry |
| 7,599,844 | B2 | 10/2009 | King et al. |
| 7,664,083 | B1 | 2/2010 | Cermak et al. |
| 7,685,254 | B2 | 3/2010 | Pandya |
| 7,730,011 | B1 | 6/2010 | Deninger et al. |
| 7,739,080 | B1 | 6/2010 | Beck et al. |
| 7,760,730 | B2 | 7/2010 | Goldschmidt et al. |
| 7,760,769 | B1 | 7/2010 | Lovett et al. |
| 7,774,604 | B2 | 8/2010 | Lowe et al. |
| 7,814,327 | B2 | 10/2010 | Ahuja et al. |
| 7,818,326 | B2 | 10/2010 | Deninger et al. |
| 7,844,582 | B1 | 11/2010 | Arbilla et al. |
| 7,849,065 | B2 | 12/2010 | Kamani et al. |
| 7,899,828 | B2 | 3/2011 | de la Iglesia et al. |
| 7,907,608 | B2 | 3/2011 | Liu et al. |
| 7,921,072 | B2 | 4/2011 | Bohannon et al. |
| 7,930,540 | B2 | 4/2011 | Ahuja et al. |
| 7,949,849 | B2 | 5/2011 | Lowe et al. |
| 7,958,227 | B2 | 6/2011 | Ahuja et al. |
| 7,962,591 | B2 | 6/2011 | Deninger et al. |
| 7,984,175 | B2 | 7/2011 | de la Iglesia et al. |
| 7,996,373 | B1 | 8/2011 | Zoppas et al. |
| 8,005,863 | B2 | 8/2011 | de la Iglesia et al. |
| 8,010,689 | B2 | 8/2011 | Deninger et al. |
| 8,055,601 | B2 | 11/2011 | Pandya |
| 8,166,307 | B2 | 4/2012 | Ahuja et al. |
| 8,176,049 | B2 | 5/2012 | Deninger et al. |
| 8,200,026 | B2 | 6/2012 | Deninger et al. |
| 8,205,242 | B2 | 6/2012 | Liu et al. |
| 8,271,794 | B2 | 9/2012 | Lowe et al. |
| 8,301,635 | B2 | 10/2012 | de la Iglesia et al. |
| 8,307,007 | B2 | 11/2012 | de la Iglesia et al. |
| 8,307,206 | B2 | 11/2012 | Ahuja et al. |
| 2001/0013024 | A1* | 8/2001 | Takahashi et al. ............. 705/59 |
| 2001/0032310 | A1* | 10/2001 | Corella ........................ 713/156 |
| 2001/0037324 | A1 | 11/2001 | Agrawal et al. |
| 2001/0046230 | A1 | 11/2001 | Rojas |
| 2002/0032677 | A1 | 3/2002 | Morgenthaler et al. |
| 2002/0032772 | A1 | 3/2002 | Olstad et al. |
| 2002/0052896 | A1 | 5/2002 | Streit et al. |
| 2002/0065956 | A1 | 5/2002 | Yagawa et al. |
| 2002/0078355 | A1* | 6/2002 | Samar .......................... 713/176 |
| 2002/0091579 | A1 | 7/2002 | Yehia et al. |
| 2002/0103876 | A1 | 8/2002 | Chatani et al. |
| 2002/0107843 | A1 | 8/2002 | Biebesheimer et al. |
| 2002/0116124 | A1 | 8/2002 | Garin et al. |

| Publication No. | Date | Name | | Publication No. | Date | Name |
|---|---|---|---|---|---|---|
| 2002/0126673 A1 | 9/2002 | Dagli et al. | | 2005/0127171 A1* | 6/2005 | Ahuja et al. ............... 235/382 |
| 2002/0128903 A1* | 9/2002 | Kernahan ................ 705/14 | | 2005/0128242 A1 | 6/2005 | Suzuki |
| 2002/0129140 A1* | 9/2002 | Peled et al. ............ 709/224 | | 2005/0131876 A1 | 6/2005 | Ahuja et al. |
| 2002/0159447 A1 | 10/2002 | Carey et al. | | 2005/0132034 A1 | 6/2005 | de la Iglesia et al. |
| 2003/0009718 A1 | 1/2003 | Wolfgang et al. | | 2005/0132046 A1 | 6/2005 | de la Iglesia et al. |
| 2003/0028493 A1 | 2/2003 | Tajima | | 2005/0132079 A1 | 6/2005 | de la Iglesia et al. |
| 2003/0028774 A1 | 2/2003 | Meka | | 2005/0132197 A1 | 6/2005 | Medlar |
| 2003/0046369 A1 | 3/2003 | Sim et al. | | 2005/0132297 A1 | 6/2005 | Milic-Frayling et al. |
| 2003/0053420 A1 | 3/2003 | Duckett et al. | | 2005/0138110 A1 | 6/2005 | Redlich et al. |
| 2003/0055962 A1 | 3/2003 | Freund et al. | | 2005/0138242 A1 | 6/2005 | Pope et al. |
| 2003/0065571 A1 | 4/2003 | Dutta | | 2005/0138279 A1 | 6/2005 | Somasundaram |
| 2003/0084300 A1 | 5/2003 | Koike | | 2005/0149494 A1 | 7/2005 | Lindh et al. |
| 2003/0084318 A1 | 5/2003 | Schertz | | 2005/0149504 A1 | 7/2005 | Ratnaparkhi |
| 2003/0084326 A1 | 5/2003 | Tarquini | | 2005/0166066 A1 | 7/2005 | Ahuja et al. |
| 2003/0093678 A1 | 5/2003 | Bowe et al. | | 2005/0177725 A1 | 8/2005 | Lowe et al. |
| 2003/0099243 A1 | 5/2003 | Oh et al. | | 2005/0180341 A1 | 8/2005 | Nelson et al. |
| 2003/0105716 A1* | 6/2003 | Sutton et al. ............ 705/50 | | 2005/0182765 A1 | 8/2005 | Liddy |
| 2003/0105739 A1 | 6/2003 | Essafi et al. | | 2005/0188218 A1 | 8/2005 | Walmsley et al. |
| 2003/0105854 A1 | 6/2003 | Thorsteinsson et al. | | 2005/0203940 A1 | 9/2005 | Farrar et al. |
| 2003/0131116 A1 | 7/2003 | Jain et al. | | 2005/0204129 A1 | 9/2005 | Sudia et al. |
| 2003/0135612 A1 | 7/2003 | Huntington | | 2005/0228864 A1* | 10/2005 | Robertson ............ 709/206 |
| 2003/0167392 A1 | 9/2003 | Fransdonk | | 2005/0235153 A1 | 10/2005 | Ikeda |
| 2003/0185220 A1 | 10/2003 | Valenci | | 2005/0273614 A1 | 12/2005 | Ahuja et al. |
| 2003/0196081 A1 | 10/2003 | Savarda et al. | | 2005/0289181 A1 | 12/2005 | Deninger et al. |
| 2003/0204741 A1 | 10/2003 | Schoen et al. | | 2006/0005247 A1 | 1/2006 | Zhang et al. |
| 2003/0221101 A1* | 11/2003 | Micali ................ 713/157 | | 2006/0021045 A1 | 1/2006 | Cook |
| 2003/0225796 A1* | 12/2003 | Matsubara ............ 707/200 | | 2006/0021050 A1 | 1/2006 | Cook et al. |
| 2003/0225841 A1* | 12/2003 | Song et al. ............ 709/206 | | 2006/0037072 A1 | 2/2006 | Rao et al. |
| 2003/0231632 A1 | 12/2003 | Haeberlen | | 2006/0041560 A1 | 2/2006 | Forman et al. |
| 2003/0233411 A1 | 12/2003 | Parry et al. | | 2006/0041570 A1 | 2/2006 | Lowe et al. |
| 2004/0001498 A1 | 1/2004 | Chen et al. | | 2006/0041760 A1 | 2/2006 | Huang |
| 2004/0010484 A1 | 1/2004 | Foulger et al. | | 2006/0047675 A1 | 3/2006 | Lowe et al. |
| 2004/0015579 A1 | 1/2004 | Cooper et al. | | 2006/0075228 A1 | 4/2006 | Black et al. |
| 2004/0036716 A1 | 2/2004 | Jordahl | | 2006/0080130 A1 | 4/2006 | Choksi |
| 2004/0054779 A1* | 3/2004 | Takeshima et al. .......... 709/225 | | 2006/0083180 A1 | 4/2006 | Baba et al. |
| 2004/0059736 A1 | 3/2004 | Willse et al. | | 2006/0106793 A1 | 5/2006 | Liang |
| 2004/0059920 A1 | 3/2004 | Godwin | | 2006/0106866 A1 | 5/2006 | Green et al. |
| 2004/0071164 A1 | 4/2004 | Baum | | 2006/0150249 A1 | 7/2006 | Gassen et al. |
| 2004/0111406 A1 | 6/2004 | Udeshi et al. | | 2006/0167896 A1 | 7/2006 | Kapur et al. |
| 2004/0111678 A1 | 6/2004 | Hara | | 2006/0184532 A1 | 8/2006 | Hamada et al. |
| 2004/0114518 A1 | 6/2004 | McFaden et al. | | 2006/0235811 A1 | 10/2006 | Fairweather |
| 2004/0117414 A1 | 6/2004 | Braun et al. | | 2006/0242126 A1 | 10/2006 | Fitzhugh |
| 2004/0120325 A1 | 6/2004 | Ayres | | 2006/0242313 A1 | 10/2006 | Le et al. |
| 2004/0122863 A1 | 6/2004 | Sidman | | 2006/0251109 A1 | 11/2006 | Muller et al. |
| 2004/0122936 A1 | 6/2004 | Mizelle et al. | | 2006/0253445 A1 | 11/2006 | Huang et al. |
| 2004/0139120 A1 | 7/2004 | Clark et al. | | 2006/0271506 A1 | 11/2006 | Bohannon et al. |
| 2004/0181513 A1 | 9/2004 | Henderson et al. | | 2006/0272024 A1 | 11/2006 | Huang et al. |
| 2004/0181690 A1 | 9/2004 | Rothermel et al. | | 2006/0288216 A1 | 12/2006 | Buhler et al. |
| 2004/0193594 A1 | 9/2004 | Moore et al. | | 2007/0006293 A1 | 1/2007 | Balakrishnan et al. |
| 2004/0194141 A1 | 9/2004 | Sanders | | 2007/0011309 A1 | 1/2007 | Brady et al. |
| 2004/0196970 A1 | 10/2004 | Cole | | 2007/0028039 A1 | 2/2007 | Gupta et al. |
| 2004/0205457 A1 | 10/2004 | Bent et al. | | 2007/0036156 A1 | 2/2007 | Liu et al. |
| 2004/0215612 A1 | 10/2004 | Brody | | 2007/0050334 A1 | 3/2007 | Deninger et al. |
| 2004/0220944 A1 | 11/2004 | Behrens et al. | | 2007/0050381 A1 | 3/2007 | Hu et al. |
| 2004/0230572 A1 | 11/2004 | Omoigui | | 2007/0050467 A1 | 3/2007 | Borrett et al. |
| 2004/0249781 A1 | 12/2004 | Anderson | | 2007/0081471 A1 | 4/2007 | Talley et al. |
| 2004/0267753 A1 | 12/2004 | Hoche | | 2007/0094394 A1 | 4/2007 | Singh et al. |
| 2005/0004911 A1 | 1/2005 | Goldberg et al. | | 2007/0106660 A1 | 5/2007 | Stern et al. |
| 2005/0021715 A1 | 1/2005 | Dugatkin et al. | | 2007/0106685 A1 | 5/2007 | Houh et al. |
| 2005/0021743 A1 | 1/2005 | Fleig et al. | | 2007/0106693 A1 | 5/2007 | Hough et al. |
| 2005/0022114 A1 | 1/2005 | Shanahan et al. | | 2007/0110089 A1 | 5/2007 | Essafi et al. |
| 2005/0027881 A1 | 2/2005 | Figueira et al. | | 2007/0112837 A1 | 5/2007 | Hough et al. |
| 2005/0033726 A1 | 2/2005 | Wu et al. | | 2007/0112838 A1 | 5/2007 | Bjarnestam et al. |
| 2005/0033747 A1 | 2/2005 | Wittkotter | | 2007/0116366 A1 | 5/2007 | Deninger et al. |
| 2005/0033803 A1 | 2/2005 | Vleet et al. | | 2007/0124384 A1 | 5/2007 | Howell |
| 2005/0038788 A1 | 2/2005 | Dettinger et al. | | 2007/0136599 A1 | 6/2007 | Suga |
| 2005/0038809 A1 | 2/2005 | Abajian et al. | | 2007/0143559 A1 | 6/2007 | Yagawa |
| 2005/0044289 A1 | 2/2005 | Hendel et al. | | 2007/0162609 A1 | 7/2007 | Pope et al. |
| 2005/0050205 A1 | 3/2005 | Gordy et al. | | 2007/0220607 A1 | 9/2007 | Sprosts et al. |
| 2005/0055327 A1 | 3/2005 | Agrawal et al. | | 2007/0226504 A1 | 9/2007 | de la Iglesia et al. |
| 2005/0055399 A1 | 3/2005 | Savchuk | | 2007/0226510 A1 | 9/2007 | de la Iglesia et al. |
| 2005/0075103 A1* | 4/2005 | Hikokubo et al. ............ 455/423 | | 2007/0248029 A1 | 10/2007 | Merkey et al. |
| 2005/0086252 A1 | 4/2005 | Jones et al. | | 2007/0271254 A1 | 11/2007 | de la Iglesia et al. |
| 2005/0091443 A1 | 4/2005 | Hershkovich et al. | | 2007/0271371 A1 | 11/2007 | Ahuja et al. |
| 2005/0091532 A1 | 4/2005 | Moghe | | 2007/0271372 A1 | 11/2007 | Deninger et al. |
| 2005/0097441 A1* | 5/2005 | Herbach et al. ............ 715/501.1 | | 2007/0280123 A1 | 12/2007 | Atkins et al. |
| 2005/0108244 A1 | 5/2005 | Riise et al. | | 2008/0027971 A1 | 1/2008 | Statchuk |
| 2005/0114452 A1* | 5/2005 | Prakash ................ 709/206 | | 2008/0028467 A1 | 1/2008 | Kommareddy et al. |
| 2005/0120006 A1 | 6/2005 | Nye | | 2008/0030383 A1 | 2/2008 | Cameron |

| | | |
|---|---|---|
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0178110 A1 | 7/2009 | Higuchi |
| 2009/0187568 A1 | 7/2009 | Morin |
| 2009/0216752 A1 | 8/2009 | Terui et al. |
| 2009/0222442 A1 | 9/2009 | Hough et al. |
| 2009/0235150 A1 | 9/2009 | Berry |
| 2009/0254532 A1 | 10/2009 | Yang et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0037324 A1 | 2/2010 | Grant et al. |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |
| 2012/0191722 A1 | 7/2012 | Deninger et al. |

OTHER PUBLICATIONS

U.S. Appl. No. 12/190,536, filed Aug. 12, 2008, entitled "Configuration Management for a Capture/Registration System," Inventor(s) Jitendra B. Gaitonde et al.
U.S. Appl. No. 12/352,720, filed Jan. 13, 2009, entitled "System and Method for Concept Building," Inventor(s) Ratinder Paul Singh Ahuja et al.
U.S. Appl. No. 12/354,688, filed Jan. 15, 2009, entitled "System and Method for Intelligent Term Grouping," Inventor(s) Ratinder Paul Ahuja et al.
U.S. Appl. No. 12/358,399, filed Jan. 23, 2009, entitled "System and Method for Intelligent State Management," Inventor(s) William Deninger et al.
U.S. Appl. No. 12/410,875, filed Mar. 25, 2009, entitled "System and Method for Data Mining and Security Policy Management," Inventor(s) Ratinder Paul Singh Ahuja et al.
U.S. Appl. No. 12/410,905, filed Mar. 25, 2009, entitled "System and Method for Managing Data and Policies," Inventor(s) Ratinder Paul Singh Ahuja et al.
Preneel, Bart, "Cryptographic Hash Functions", Proceedings of the 3rd Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.
U.S. Appl. No. 11/254,436, filed Oct. 19, 2005, entitled "Attributes of Captured Objects in a Capture System," Inventor(s) William Deninger et al.
U.S. Appl. No. 12/472,150, filed May 26, 2009, entitled "Identifying Image Type in a Capture System," Inventor(s) William Deninger et al.
U.S. Appl. No. 11/900,964, filed Sep. 14, 2007, entitled "System and Method for Indexing a Capture System," Inventor(s) Ashok Doddapaneni et al.
U.S. Appl. No. 12/171,232, filed Jul. 10, 2008, entitled "System and Method for Data Mining and Security Policy Management," Inventor(s) Weimin Liu et al.
Microsoft Outlook, Out look, copyright 1995-2000, 2 pages.
U.S. Appl. No. 12/873,860, filed Sep. 1, 2010, entitled "A System and Method for Word Indexing in a Capture System and Querying Thereof," Inventor(s) William Deninger, et al.
U.S. Appl. No. 12/829,220, filed Jul. 1, 2010, entitled "Verifying Captured Objects Before Presentation," Inventor(s) Rick Lowe, et al.
U.S. Appl. No. 12/873,061, filed Aug. 31, 2010, entitled "Document Registration," Inventor(s) Ratinder Paul Singh Ahuja, et al.
U.S. Appl. No. 12/939,340, filed Nov. 3, 2010, entitled "System and Method for Protecting Specified Data Combinations," Inventor(s) Ratinder Paul Singh Ahuja, et al.
U.S. Appl. No. 12/967,013, filed Dec. 13, 2010, entitled "Tag Data Structure for Maintaining Relational Data Over Captured Objects," Inventor(s) Erik de la Iglesia, et al.
Han, OLAP Mining: An Integration of OLAP with Data Mining, 1997, pp. 1-18.
Niemi, Constructing OLAP Cubes Based on Queries, 2001, pp. 1-7.
Schultz, Data Mining for Detection of New Malicious Executables, 2001, pp. 1-13.
U.S. Appl. No. 13/099,516, filed May 3, 2011, entitled "Object Classification in a Capture System," Inventor(s) William Deninger, et al.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," Inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.
Mao et al. "MOT: Memory Online Tracing of Web Information System," Proceedings of the Second International Conference on Web Information Systems Engineering (WISE '01); pp. 271-277, (IEEE0-0-7695-1393-X/02) Aug. 7, 2002 (7 pages).
U.S. Appl. No. 13/168,739, filed Jun. 24, 2011, entitled "Method and Apparatus for Data Capture and Analysis System," Inventor(s) Erik de la Iglesia, et al.
U.S. Appl. No. 13/187,421, filed Jul. 20, 2011, entitled "Query Generation for a Capture System," Inventor(s) Erik de la Iglesia, et al.
U.S. Appl. No. 13/188,441 filed Jul. 21, 2011, entitled "Locational Tagging in a Capture System," Inventor(s) William Deninger et al.
International Search Report and Written Opinion and Declaration of Non-Establishment of International Search Report for International Application No. PCT/US2011/024902 mailed Aug. 1, 2011 (8 pages).
T. Werth, A. Dreweke, I. Fischer, M. Philippsen; DAG Mining in Procedural Abstraction; Programming Systems Group; Computer Science Department, University of Erlangen-Nuremberg, Germany, Sep. 19, 2011 Nonfinal Rejection.
Webopedia, definition of "filter", 2002, p. 1.
Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.
U.S. Appl. No. 12/751,876, filed Mar. 31, 2010, entitled "Attributes of Captured Objects in a Capture System," Inventor(s) William Deninger, et al.

U.S. Appl. No. 13/422,791, filed Mar. 16, 2012, entitled "System and Method for Data Mining and Security Policy Management", Inventor, Weimin Liu.

U.S. Appl. No. 13/424,249, filed Mar. 19, 2012, entitled "System and Method for Data Mining and Security Policy Management", Inventor, Weimin Liu.

U.S. Appl. No. 13/431,678, filed Mar. 27, 2012, entitled "Attributes of Captured Objects in a Capture System", Inventors William Deninger, et al.

U.S. Appl. No. 13/436,275, filed Mar. 30, 2012, entitled "System and Method for Intelligent State Management", Inventors William Deninger, et al.

U.S. Appl. No. 13/337,737, filed Dec. 27, 2011 and entitled "System and Method for Providing Data Protection Workflows in a Network Environment", inventor(s) Ratinder Paul Singh Ahuja, et al.

U.S. Appl. No. 13/338,060, filed Dec. 27, 2011 and entitled "System and Method for Providing Data Protection Workflows in a Network Environment", inventor(s) Ratinder Paul Singh Ahuja, et al.

U.S. Appl. No. 13/338,159, filed Dec. 27, 2011 and entitled "System and Method for Providing Data Protection Workflows in a Network Environment", inventor(s) Ratinder Paul Singh Ahuja, et al.

U.S. Appl. No. 13/338,195, filed Dec. 27, 2011 and entitled "System and Method for Providing Data Protection Workflows in a Network Environment", inventor(s) Ratinder Paul Singh Ahuja, et al.

International Preliminary Report on Patentability in PCT International Patent Application Serial No. PCT/US2011/024902 mailed on May 7, 2013 (5 pages).

Allasia, et al. "Indexing and Retrieval of Multimedia Metadata on a Secure DHT", University of Torinao, Italy, Department of Computer Science, Aug. 31, 2008.

* cited by examiner

DOCUMENT DE-REGISTRATION

PRIORITY AND RELATED APPLICATIONS

This patent application is related to, incorporates by reference, and claims the priority benefit of U.S. Provisional Application 60/528,631, entitled "DOCUMENT REGISTRATION", filed Dec. 10, 2003.

FIELD OF THE INVENTION

The present invention relates to computer networks, and in particular, to registering documents in a computer network.

BACKGROUND

Computer networks and systems have become indispensable tools for modem business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyze the data leaving the network to monitor for policy violations, and make it possible to track down information leaks. What is needed is a comprehensive system to capture, store, and analyze all data communicated using the enterprises network.

SUMMARY OF THE INVENTION

A document accessible over a network can be registered. A registered document, and the content contained therein, cannot be transmitted undetected over and off of the network. In one embodiment, the invention includes maintaining a plurality of stored signatures in a signature database, each signature being associated with one of a plurality of registered documents. In one embodiment, the invention further includes maintaining the signature database by de-registering documents by removing the signatures associated with de-registered documents. In one embodiment, the invention further includes maintaining the database by removing redundant and high detection rate signatures. In one embodiment, the invention also includes maintaining the signature database by removing signatures based on the source text used to generate the signature.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
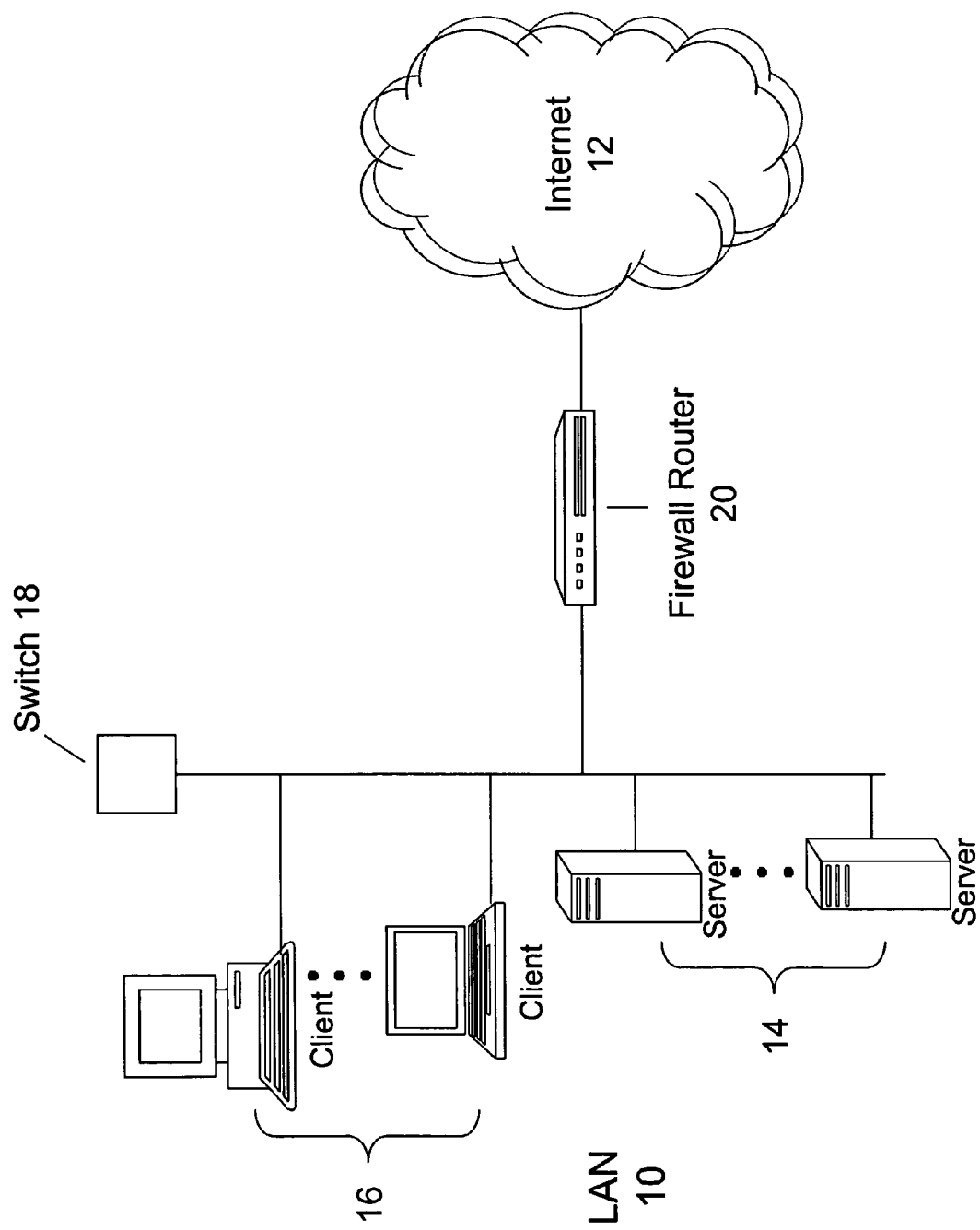
FIG. 1 is a block diagram illustrating a computer network connected to the Internet.

FIG. 1 illustrates a simple prior art configuration of a local area network (LAN) 10 connected to the Internet 12. Connected to the LAN 10 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 20. However, there the router 20 merely forwards packets to the Internet 12. The router 20 cannot capture, analyze, and store, in a searchable manner, the content contained in the forwarded packets.

Figure 2:
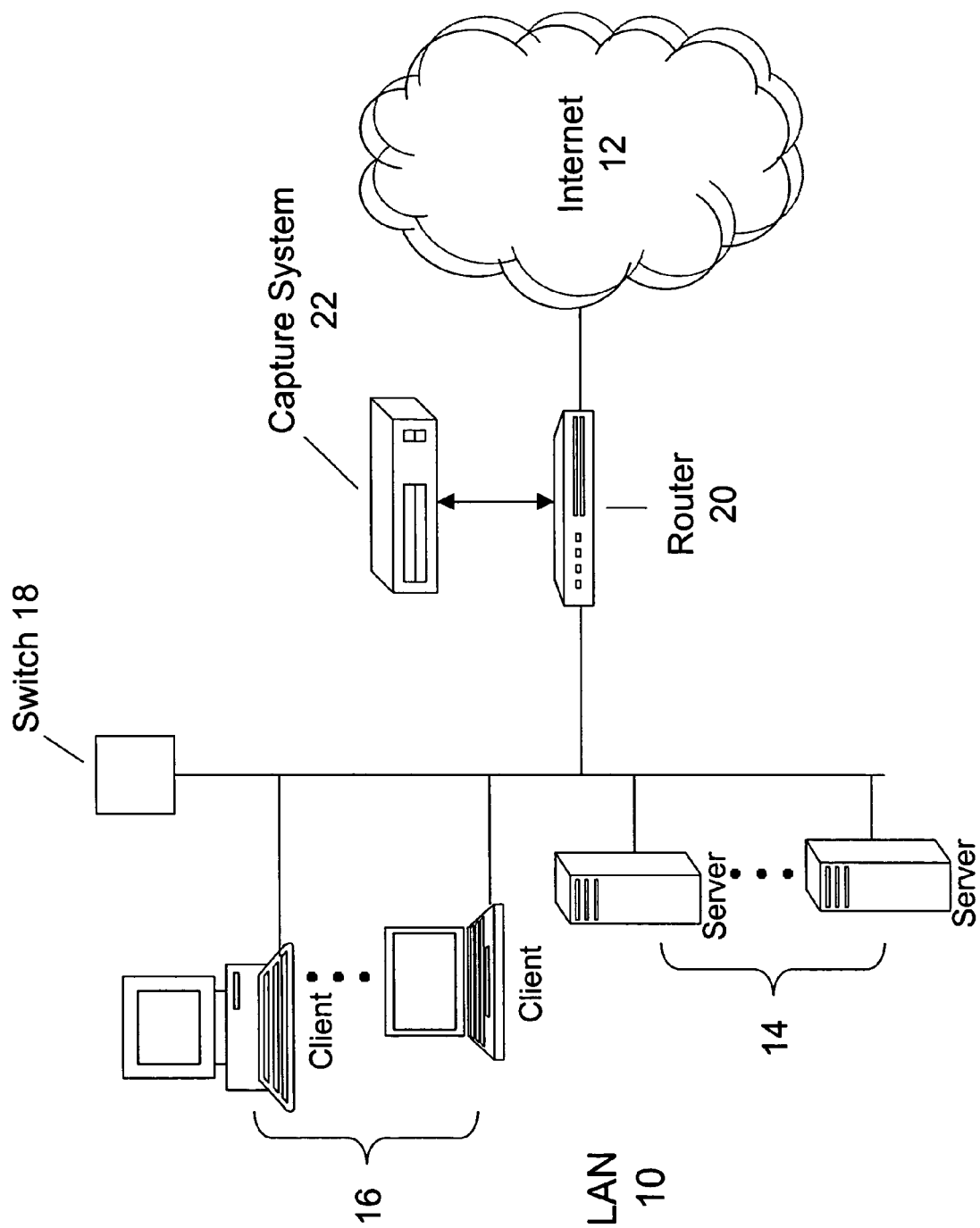
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 20 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 20 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
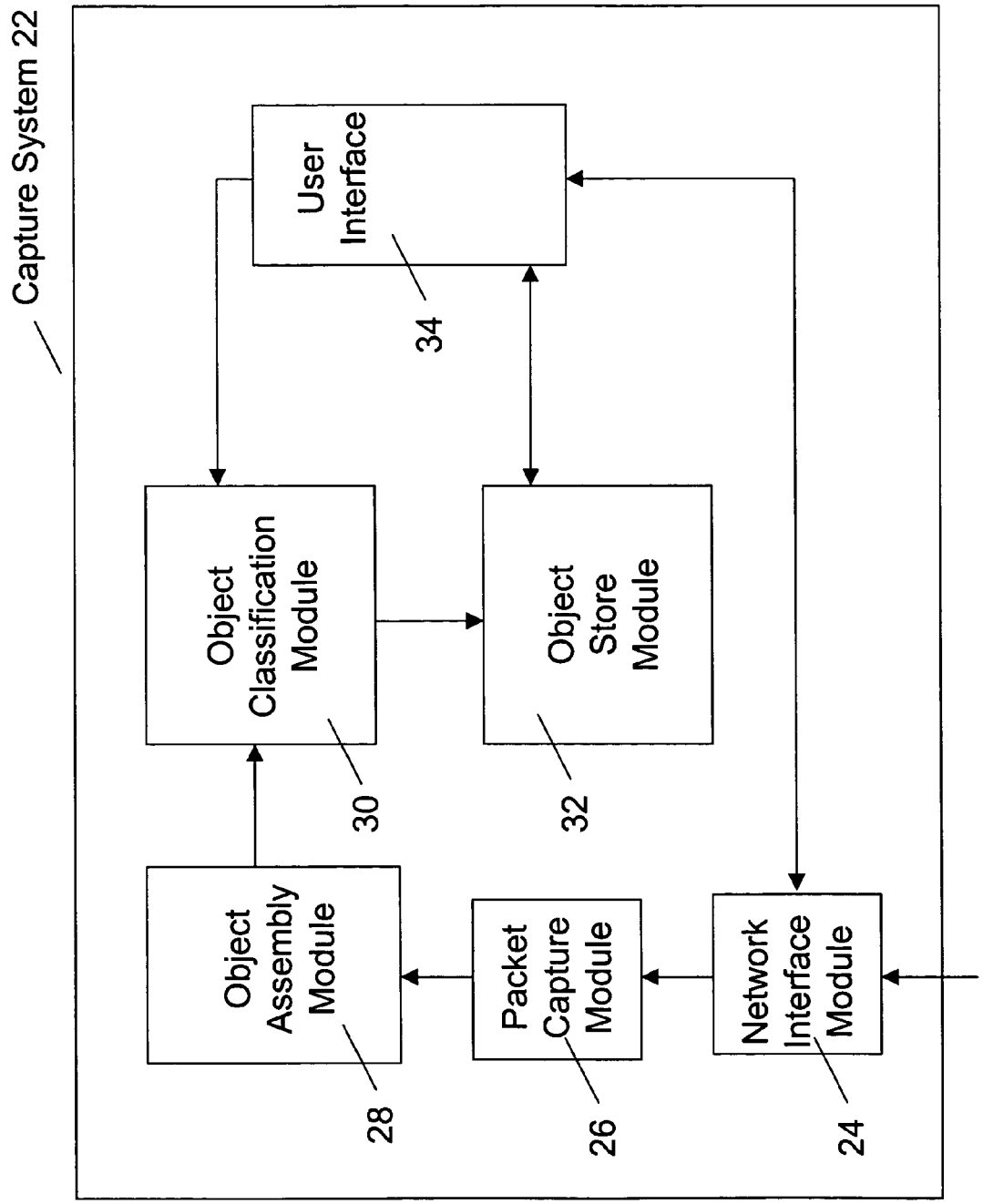
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 is also sometimes referred to as a content analyzer, content or data analysis system, and other similar names. In one embodiment, the capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
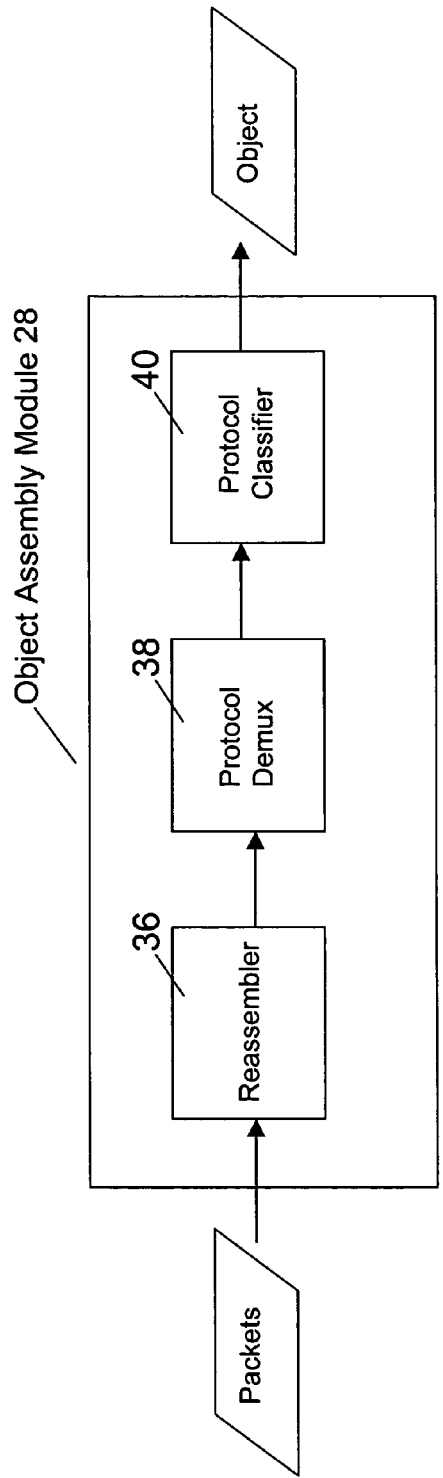
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If no finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the reassembler 36. Thus, in one embodiment, a flow is an ordered data stream of a single communication between a source and a destination.

The flow assembled by the reassembler 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
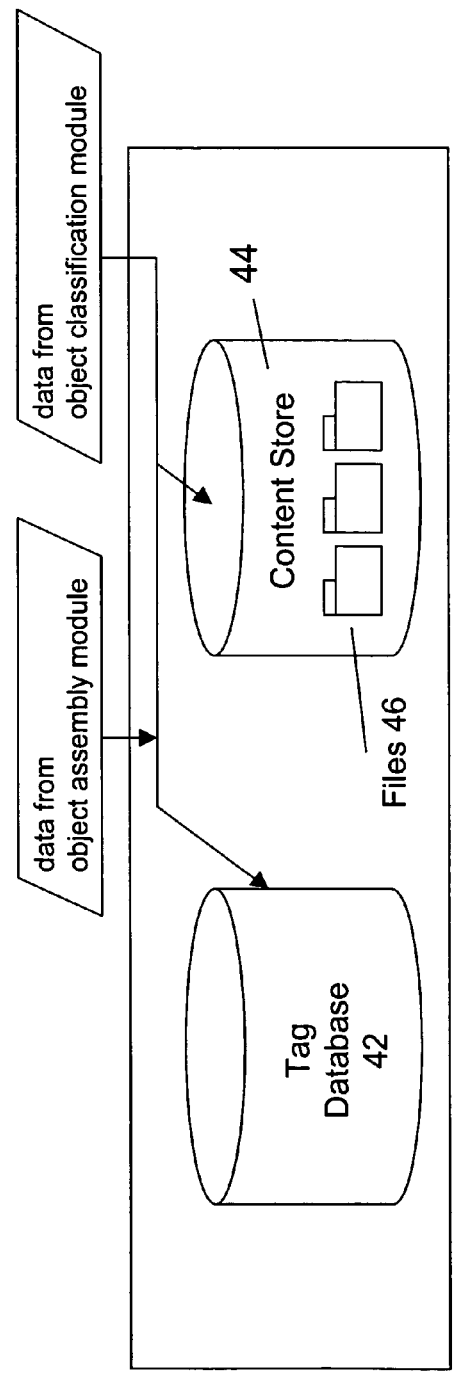
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44, and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database; other data structures can be used. The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

Referring again to FIG. 3, in one embodiment, the objects and tags stored in the object store module 32 can be interactively queried by a user via the user interface 34. In one embodiment the user interface can interact with a web server (not shown) to provide the user with Web-based access to the capture system 22. The objects in the content store module 32 can thus be searched for specific textual or graphical content using exact matches, patterns, keywords, and various other advanced attributes.

For example, the user interface 34 can provide a query-authoring tool (not shown) to enable users to create complex searches of the object store module 32. These search queries can be provided to a data mining engine (not shown) that parses the queries, scans the tag database 42, and retrieves the found object from the content store 44. Then, these objects that matched the specific search criteria in the user-authored query can be counted and displayed to the user by the user interface 34.

Searches can also be scheduled to occur at specific times or at regular intervals, that is, the user interface 34 can provide access to a scheduler (not shown) that can periodically execute specific queries. Reports containing the results of these searches can be made available to the user at a later time, mailed to the administrator electronically, or used to generate an alarm in the form of an e-mail message, page, syslog or other notification format.

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
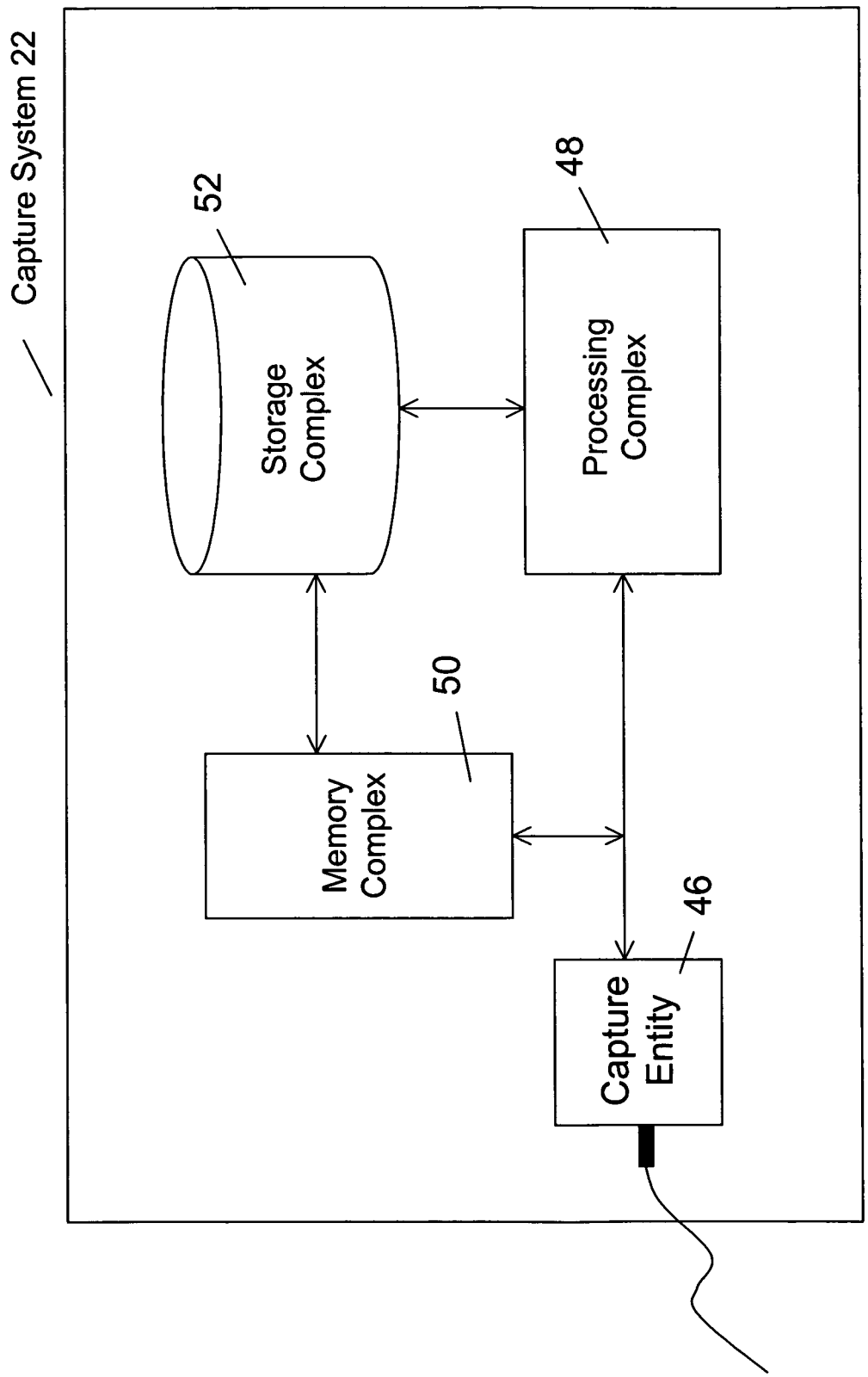
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Document Registration

The capture system 22 described above can also be used to implement a document registration scheme. In one embodiment, the a user can register a document with the system 22, which can then alert the user if all or part of the content in the registered document is leaving the network. Thus, one embodiment of the present invention aims to prevent unauthorized documents of various formats (e.g., Microsoft Word, Excel, PowerPoint, source code of any kind, text) from leaving an enterprise. There are great benefits to any enterprise that can keep its intellectual property, or other critical, confidential, or otherwise private and proprietary content from being mishandled.

Figure 7:
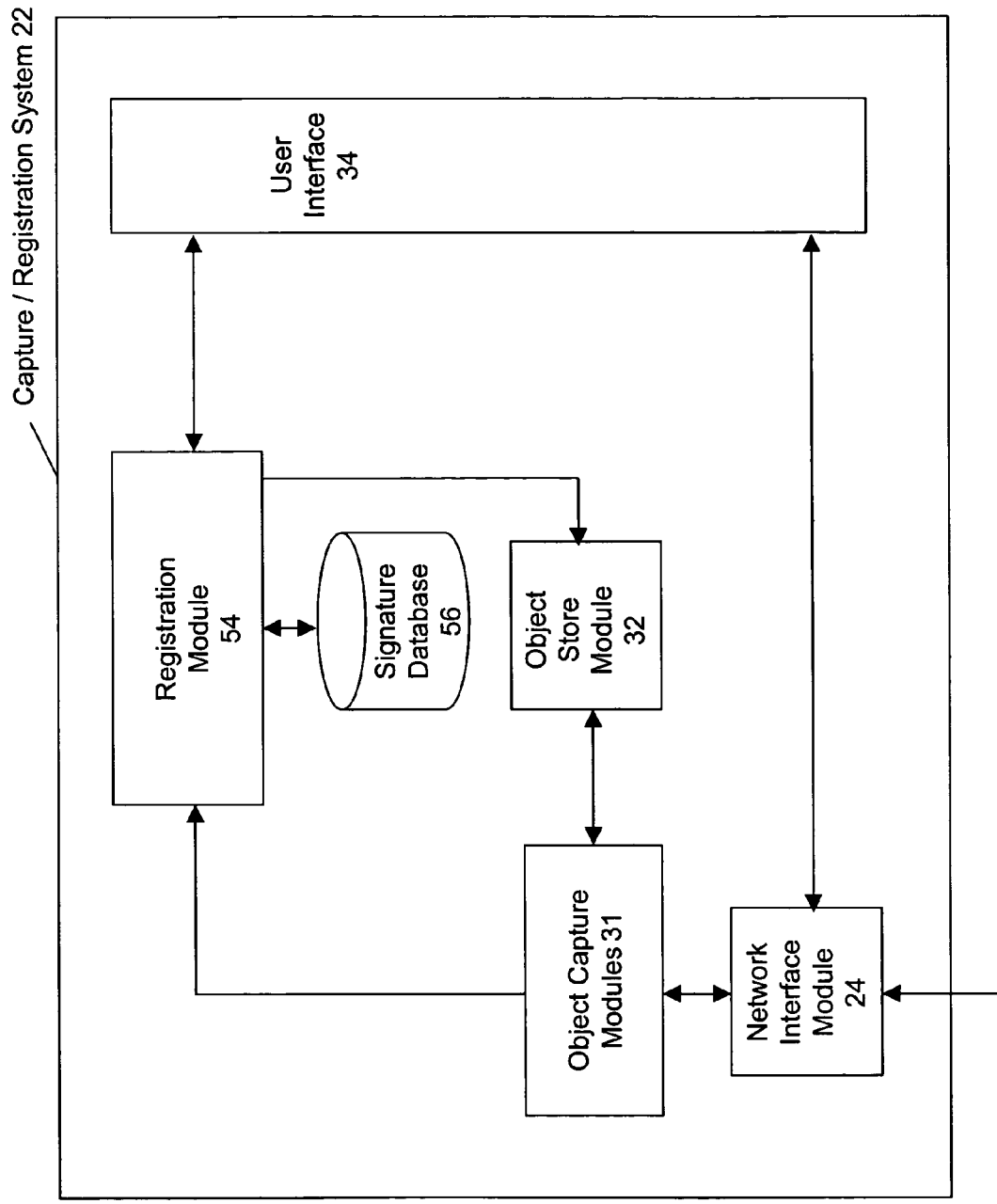
FIG. 7 is a block diagram illustrating a document registration system according to one embodiment of the present invention.

In one embodiment of the present invention, sensitive documents are registered with the capture system 22, although data registration can be implemented using a separate device in other embodiments. One embodiment of implementing registration capability in the capture system 22 is now described with reference to FIG. 7. For descriptive purposes, the capture system 22 is renamed the capture/registration system 22 in FIG. 7, and is also sometimes referred to as the registration system 22 in the description herein. The capture/registration system 22 has components similar or identical to the capture system 22 shown in FIG. 3, including the network interface module 24, the object store module 32, the user interface 34, and the packet capture 26, object assembly 28, and object classification 30 modules, which are grouped together as object capture modules 31 in FIG. 7.

In one embodiment, the capture/registration system 22 also includes a registration module 54 interacting with a signature database 56 to facilitate a registration scheme. In one embodiment, the user can register a document via the user interface 34. There are numerous ways to register documents. For example, a document can be electrically mailed (e-mailed), or uploaded to the registration system 22. The registration system 22 can also periodically scan a file server (registration server) for documents to be registered. The registration process can be integrated with the enterprise's document management systems. Document registration can also be automated and transparent based on registration rules, such as "register all documents," or "register all documents by specific author or IP address," and so on.

After being received, in one embodiment, a document to be registered is passed to the registration module 54. The registration module 54 calculates a signature of the document, or a set of signatures. The set of signatures associated with the document can be calculated in various ways. For example, the signatures can be made up of hashes over various portions of the document, such as selected or all pages, paragraphs, tables and sentences. Other possible signatures include, but are not limited to, hashes over embedded content, indices, headers or footers, formatting information or font utilization. The signatures can also include computations and met-data other than hash digests, such as Word Relative Frequency Methods (RFM)—Statistical, Karp-Rabin Greedy-String-Tiling-Transposition, vector space models, and diagrammatic structure analysis.

The set of signatures is then stored in the signature database 56. The signature database 56 need not be implemented as a database; the signatures can be maintained using any appropriate data structure. In one embodiment, the signature database 56 is part of the storage complex 52 in FIG. 6.

In one embodiment, the registered document is also stored as an object in the object store module 32. In one embodiment, the document is only stored in the content store 44 with no associated tag, since many tag fields do not apply to registered documents. In one embodiment, one file of files 46 is a "Registered Documents" file.

In one embodiment, the document received from the user is now registered. As set forth above, in one embodiment, the object capture modules 31 continue to extract objects leaving the network, and store various objects based on capture rules. In one embodiment, all extracted objects—whether subject to a capture rule or not—are also passed to the registration module for a determination whether each object is, or includes part of, a registered document.

In one embodiment, the registration module 54 calculates the set of signatures of an object received from the object capture modules 31 in the same manner as of a document received from the user interface 34 to be registered. This set of signatures is then compared against all signatures in the signature database 56. In other embodiment, parts of the signature database can be excluded from this search to save time.

In one embodiment, an unauthorized transmission is detected if any one or more signatures in the set of signatures of an extracted object matches one or more signature in the signature database 56 associated with a registered document. Other detection tolerances can be configured for different embodiment, e.g., at least two signatures must match. Also, special rules can be implemented that make the transmission authorized, e.g., if the source address is authorized to transmit any documents off the network.

Figure 8:
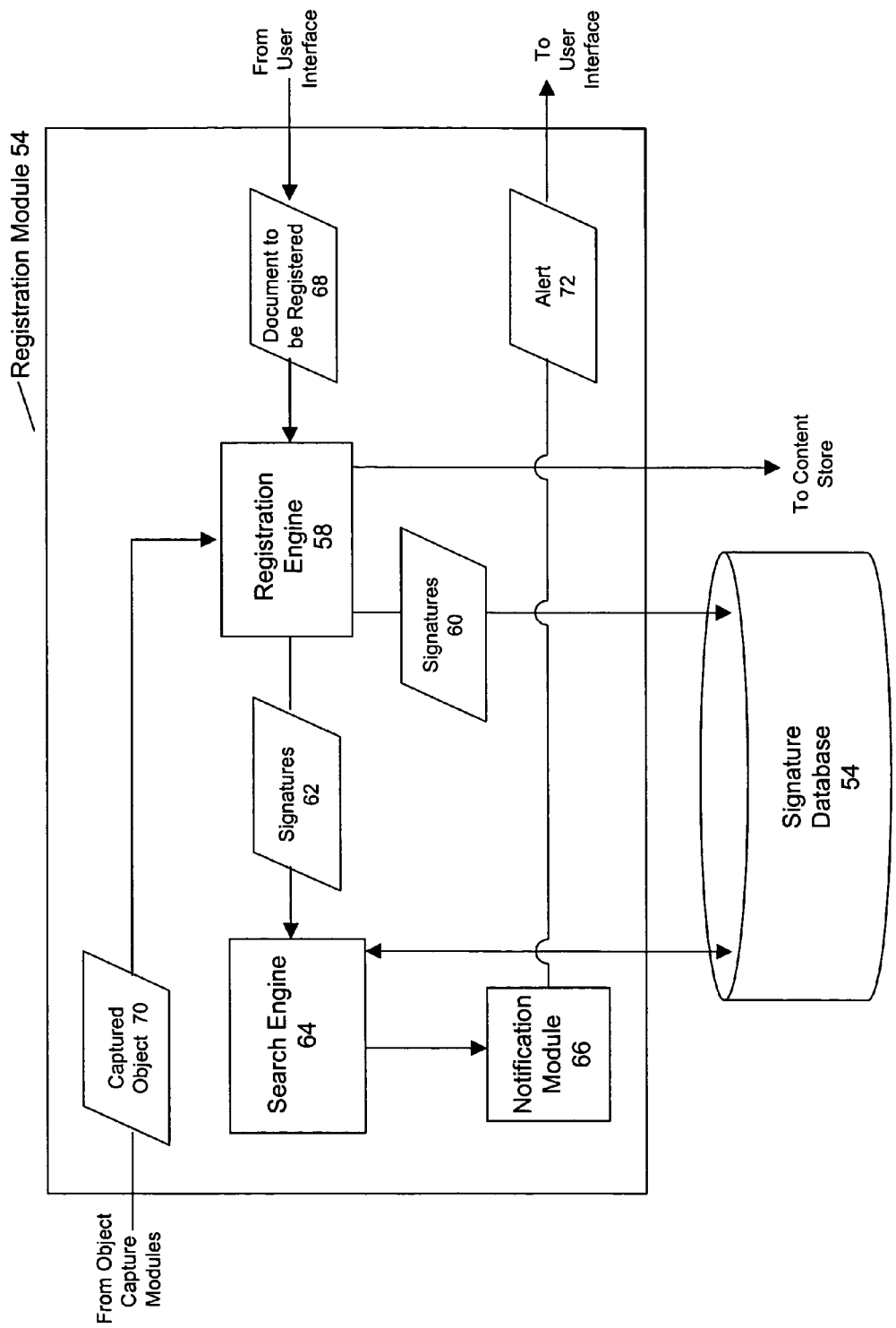
FIG. 8 is a block diagram illustrating registration module according to one embodiment of the present invention.

One embodiment of the registration module 54 is now described with reference to FIG. 8. As discussed above, a document to be registered 68 arrives via the user interface 34. The registration engine 58 generates signatures 60 for the document 68 and forwards the document 68 to the content store 44 and the signatures 60 to the signature database 54. The signatures 60 are associated with the document, e.g., by including a pointer to the document 68, or to some attribute from which the document 68 can be identified.

A captured object 70 arrives via the object capture modules 31. The registration engine calculates the signatures 62 of the captured object, and forwards them to the search engine 64. The search engine 64 queries the signature database 54 to compare the signatures 62 to the signatures stored in the signature database 54. Assuming for the purposes of illustration, that the captured object 70 is a Word document that contains a pasted paragraph from registered PowerPoint document 68, at least one signature of signatures 62 will match a signature of signatures 60. Such an event can be referred to as the detection of an unauthorized transfer, a registered content transfer, or other similarly descriptive terms.

In one embodiment, when a registered content transfer is detected, the transmission can be halted with or without warning to the sender. In one embodiment, in the event of a detected registered content transfer, the search engine 64 activates the notification module 66, which sends an alert 72 to the user via the user interface 34. In one embodiment, the notification module 66 sends different alerts—including different user options—based on the user preference associated with the registration, and the capabilities of the registration system 22.

In one embodiment, the alert 72 can simply indicate that the registered content, i.e., the captured object 70, has been transferred off the network. In addition, the alert 72 can provide information regarding the transfer, such as source IP, destination IP, any other information contained in the tag of the captured object, or some other derived information, such as the name of the person who transferred the document off the network. The alert 72 can be provided to one or more users via e-mail, instant message (IM), page, or any other notification method. In one embodiment, the alert 72 is only sent to the entity or user who requested registration of the document 68.

In another embodiment, the delivery of the captured object 70 is halted—the transfer is not completed—unless the user who registered the document 68 consents. In such an embodiment, the alert 72 can contain all information described above, and in addition, contain a selection mechanism, such as one or two buttons—to allow the user to indicate whether the transfer of the captured object 70 may be completed. If the user elects to allow the transfer, for example because he is aware that someone is emailing a part of a registered document 68 (e.g., a boss asking his secretary to send an email), the transfer is executed and the object 70 is allowed to leave the network.

If the user disallows the transfer, the captured object 70 is not allowed off the network, and delivery is permanently halted. In one embodiment, halting delivery can be accomplished by implementing an intercept technique by having the registration system 22 proxy the connection between the network and the outside. In other embodiments, delivery can be halted using a black hole technique—discarding the packets without notice if the transfer is disallowed—or a poison technique—inserting additional packets onto the network to cause the sender's connection to fail.

Figure 9:
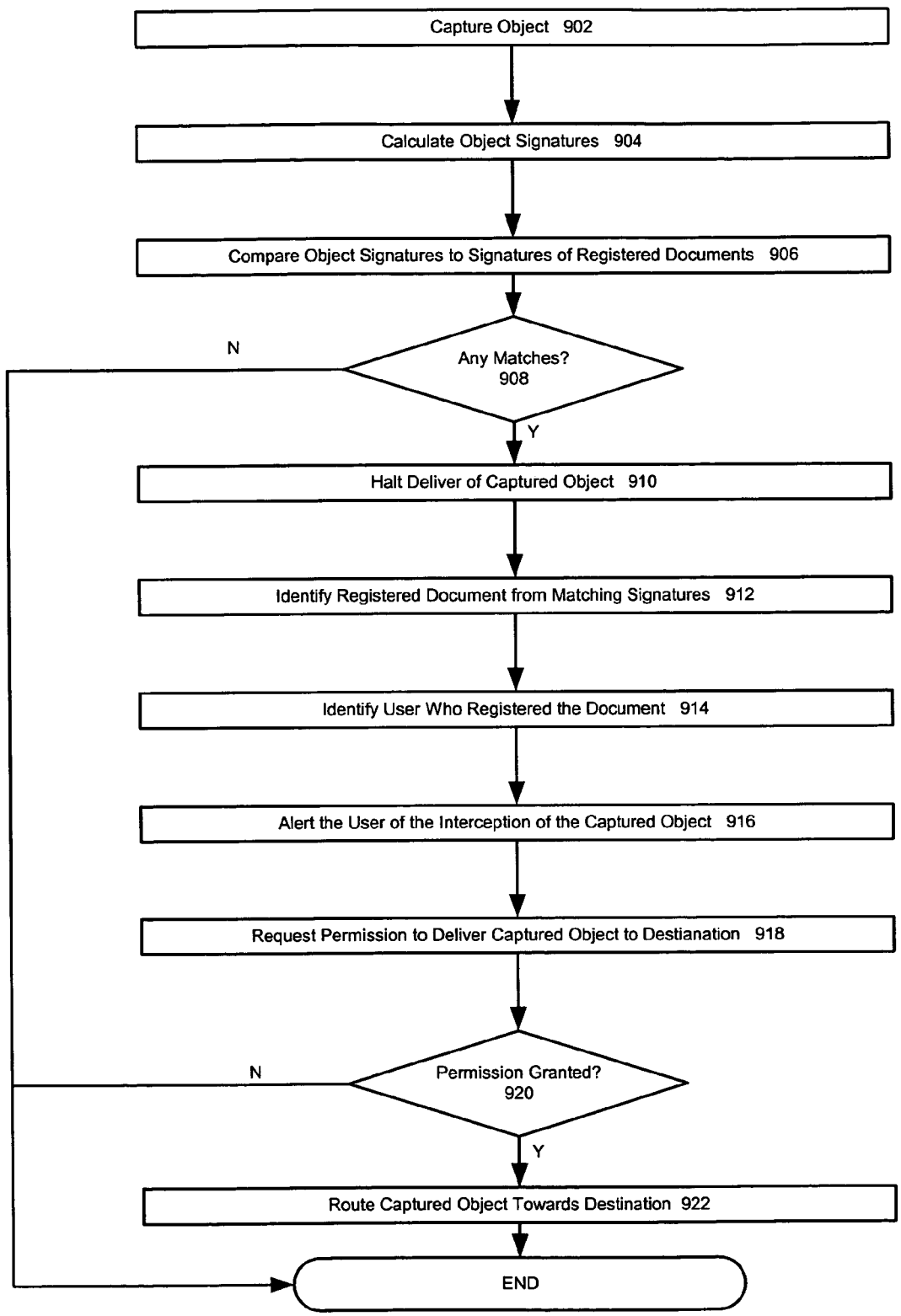
FIG. 9 is a flow diagram illustrating object capture processing according to one embodiment of the present invention.

FIG. 9 provides a flow chart to further illustrate object capture/intercept processing according to one embodiment of the present invention. All blocks of FIG. 9 have already been discussed herein. The example object capture processing shown in FIG. 9 assumes that various documents have already been registered with the registration system 22. The process shown in FIG. 9 can be repeated for all objects captured by the system 22.

Document De-Registration and Signature Database Maintenance

In one embodiment, documents can also be de-registered when their content is no longer considered worthy of registration by a user. Various other signature database 54 maintenance processes can be implemented. Referring again to FIG. 8, in one embodiment, the registration engine 58 is also used to de-register documents. De-registration can be performed similarly to registration and interception, with the end result being the removal, as opposed to the addition of, the signatures generated.

Figure 10:
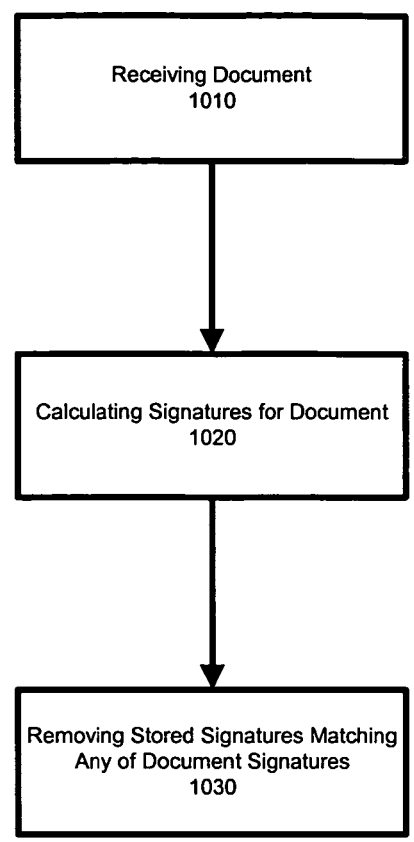
FIG. 10 is a flow diagram illustrating document de-registration processing according to one embodiment of the present invention.

Thus, in one embodiment, when the registration engine 58 receives a document to be de-registered it generates a set of signatures associated with the document, and provides these signatures to the search engine 64. The search engine 64 identifies the signatures in the signature database 54 that match any of the signatures associated with the document to be de-registered. Then, these matching signatures are removed from the signature database, resulting in the de-registration of the document. A simplified flowchart illustrating such an embodiment is provided in FIG. 10. The next time the document is intercepted, none of its signatures will match any in the database.

Document de-registration can also be performed, in one embodiment, using the name of the document the user wishes to de-register. As explained above, the name of a document or object can be constructed to be unique in a number of ways, such as combining several tag fields. Since the signatures in the signature database 54 are associated with documents in the object store module 32, the set of signatures associated with a uniquely identified document are readily ascertainable. Thus, in one embodiment, the user can provide a name of a document to be de-registered via the user interface 34, in response to which all signatures associated with that document are removed from the signature database 54.

Document de-registration can be automated. In one embodiment, the registration rules also include temporal registration parameters. Thus, certain documents only stay registered for some period of time after which they become automatically de-registered by any of the de-registration procedures described herein. Other such de-registration rules can be authored and implemented by the system.

Figure 11:
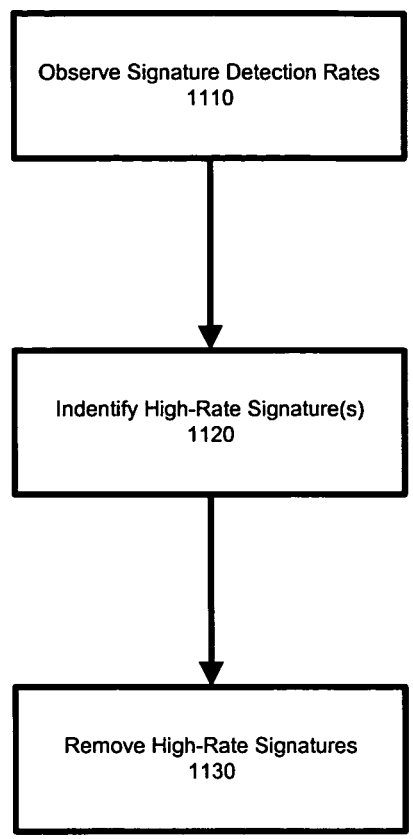
FIG. 11 is a flow diagram illustrating signature database maintenance according to one embodiment of the present invention.

In one embodiment, aspects of signature database 54 maintenance are also automated. One embodiment of automated database maintenance is now described with reference to FIG. 11. In block 1110, the signature detection rate is observed for each signature. In one embodiment, the signature detection rate signifies how often a signature is detected in captured objects. It can be implemented as a canonical count, as some number of occurrences during specified periods of time, a percentage of captured objects that triggers the signature, or some other rate of occurrence indicator.

In block 1120, a signature—or set of signatures—with a high rate of detection is identified. This can be done by observing that the detection rate of some signatures exceeds a configurable rate threshold. For example, it is observed that a signature is found in 50 percent of all captured objects, and the rate threshold is 10 percent. This signature would be identified as a high-rate signature. Finally, in block 1130, the identified high-rate signatures are removed from the signature database.

In one embodiment, database maintenance is further automated by periodic examination of the source data resulting in the signatures. For example, a signature may result from source data contained in the registered document that is irrelevant text (e.g., copyright notice), unparsable text, or text contained on a signature blacklist identifying text that should not generate signatures.

For example, the signature blacklist may contain specific words, phrases, or set of words that are known to result in unusable signatures (e.g., high-rate signatures). Similarly, a whitelist is maintained, in one embodiment, containing text that should be used for signatures. For example, if a signature resulted from source data contained in the whitelist, it may not be removed for other reasons, such as being a high-rate signature.

In one embodiment, maintaining the signature database 54 includes periodically eliminating redundant signatures from the database 54. Redundant signatures are identical, but are associated with different registered documents. For example, if a registration rule registers all source code files, then the comment header will result in an identical signature (based on the identical comment header) being associated with all these registered documents.

One problem that can arise from such a situation, is that when a source code file is intercepted, one signature (based on the comment header) will match a great number of signatures associated with different registered documents. In one embodiment, this is solved by removing redundant signatures from the database 54. In one embodiment, redundant signatures are defined as a set of identical signatures common to more than a threshold number of registered documents. For example, if more than five registered documents have an associated identical signature, then all of these redundant signatures are removed from the database 54.

Figure 12:
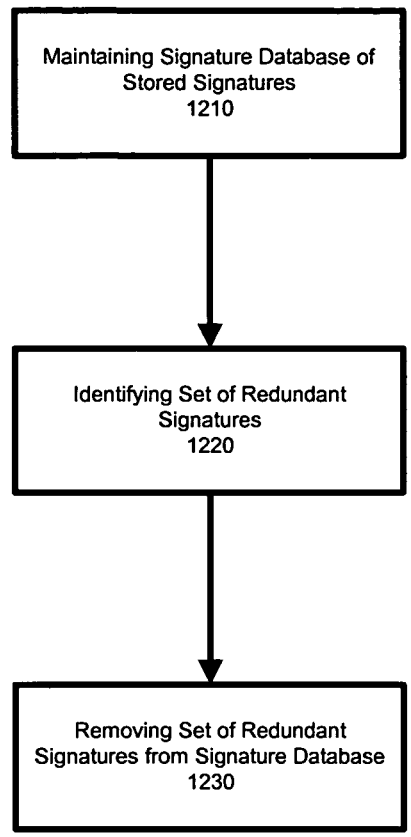
FIG. 12 is a flow diagram illustrating signature database maintenance according to another embodiment of the present invention.

In one embodiment, signatures stored in the signature database 54 are accessible via the user interface 34. Thus, a user can individually select and remove signatures from the database 34. For example, if a user observes that a signature is generating too many false-positives (noticing irrelevant registered content), then the user can remove that signature from the database 34. An illustration of removing redundant signatures is provided in the form of a simplified flowchart in FIG. 12.

Thus, a capture system and a document/content registration system have been described. In the forgoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules, such as the search engine 64 and the notification module 66 in FIG. 8, can be implemented as software or hardware modules, or without dividing their functionalities into modules at all. The present invention is not limited to any modular architecture either in software or in hardware, whether described above or not.

What is claimed is:

1. A method to be performed in an electronic environment in which network communications occur involving packets and at least one processor and a memory element, comprising:
monitoring security of a plurality of registered digital documents in a system, the monitoring including determining whether signatures associated with the registered digital documents are included in data propagating in network traffic of the system, wherein the signatures of the registered documents are maintained in a signature database, each signature being associated with at least one of the plurality of registered digital documents, and respective signatures are removed from the database upon determining that respective signatures are detected within the network traffic at a rate in excess of a threshold detection rate designated as a threshold percentage of all data objects detected in the network traffic;
receiving a particular document, in the plurality of the registered digital documents, to be de-registered in response to an expiration of a time interval associated with an initial registration of the particular document;
calculating a set of signatures associated with the received particular document;
identifying, in the signatures stored in the signature database, at least one signature included in the set of calculated signatures; and
removing from the signature database the at least one identified signature included in the set of calculated signatures associated with the particular document, wherein data in the network traffic detected to include a signature of a registered document is intercepted and data in the network traffic determined to not include a signature of a registered document is allowed to propagate unintercepted to its intended destination.

2. The method of claim 1, wherein the document to be de-registered has exceeded a temporal registration threshold for the document.

3. A method to be performed in an electronic environment in which network communications occur involving packets and at least one processor and a memory element, comprising:
monitoring security of a plurality of registered digital documents in a system using a capture system, the monitoring including determining whether signatures associated with the registered digital documents are included in data propagating in network traffic of the system, wherein the signatures of the registered documents are maintained in a signature database, each signature being associated with at least one of the plurality of registered digital documents, and respective signatures are removed from the database upon determining that respective signatures are detected within the network traffic at a rate in excess of a threshold detection rate designated as a threshold percentage of all data objects detected in the network traffic;
receiving a request to de-register an identified document from the plurality of registered digital documents in response to an expiration of a time interval associated with an initial registration of the identified document; and
de-registering the identified document by removing all signatures associated with the identified document from the signature database, wherein the capture system that maintains the stored signatures is configured to allow a received document to be forwarded from the capture system to its intended destination at a network node unless a capture rule prohibits forwarding the received document based on the detection of one or more of the signatures of the registered documents included in the received document.

4. The method of claim 3, wherein the request identifies the identified document by a unique name.

5. The method of claim 3, further comprising determining that the identified document exceeds a temporal registration threshold.

6. A method to be performed in an electronic environment in which network communications occur involving packets and at least one processor and a memory element, comprising:
monitoring security of a plurality of registered digital documents in a system, the monitoring including determining whether signatures associated with the registered digital documents are included in data propagating in network traffic of the system, wherein the signatures of the registered documents are maintained in a signature database, each signature being associated with at least one of the plurality of registered digital documents, wherein respective signatures are removed from the database after determining that the respective signatures are detected within the network traffic at a rate in excess of a threshold detection rate, which is designated as a threshold percentage of data objects detected in the network traffic;

identifying at least one redundant signature maintained in the signature database, wherein a redundant signature is a signature shared by multiple different digital documents in the plurality of registered digital documents; and removing the at least one redundant signature from the signatures maintained in the signature database;

identifying a particular document in the plurality of digital documents that is to be deregistered; and de-registering the particular document by removing all signatures associated with the particular document from the signature database;

wherein registered data that is detected as including a signature of at least one of the plurality of registered digital documents is intercepted prior to its intended destination and data that is detected as not including a signature of at least one of the plurality of registered digital documents is allowed to be forwarded to its intended destination at a network node.

7. The method of claim 6, wherein identifying the set of redundant signatures comprises identifying a plurality of identical signatures.

8. The method of claim 6, wherein identifying the set of redundant signatures comprises identifying a threshold number of identical signatures associated with a threshold number of different registered documents.

9. The method of claim 1, wherein the threshold detection rate of the particular signature further includes a number of times the particular signature is generated from data objects detected in the network traffic during a time window.

10. The method of claim 9, wherein the threshold detection rate of the particular signature further includes a rate of signature appearance per day.

11. A method to be performed in an electronic environment in which network communications occur involving packets and at least one processor and a memory element, comprising:

providing a database of stored signatures, each signature being associated with one of a plurality of registered documents, wherein a particular signature is removed from the signature database based on identifying that the particular signature was detected within network traffic of a particular network in excess of a threshold detection rate designated as a threshold percentage of all data objects detected in the network traffic;

monitoring security of the plurality of registered documents, the monitoring including identifying attempts to forward registered documents to nodes outside of the particular network by identifying data propagating within the particular network that includes one or more signatures maintained in the signature database and associated with the plurality of registered documents;

receiving a selected document, included in the plurality of registered documents, that is to be de-registered in response to an expiration of a time interval associated with an initial registration of the selected document; and de-registering the selected document by removing all signatures associated with the selected document from the signature database;

wherein data propagating within the particular network that is detected as not including a signature of at least one of the plurality of registered digital documents is allowed to be forwarded outside of the particular network.

12. The method of claim 11, wherein the set of signatures comprises signatures generated from unparsable source text.

13. The method of claim 11, wherein the set of signatures comprises signatures generated from source text appearing on a signature blacklist.

14. A non-transitory machine-readable medium storing data representing instructions that, when executed by a processor, cause the processor to perform operations comprising:

monitoring security of a plurality of registered digital documents in a system, the monitoring including determining whether signatures associated with the registered digital documents are included in data propagating in network traffic of the system, wherein the signatures of the registered documents are maintained in a signature database, each signature being associated with at least one of the plurality of registered digital documents, and respective signatures are removed from the database upon determining that respective signatures are detected within the network traffic at a rate in excess of a threshold detection rate designated as a threshold percentage of all data objects detected in the network traffic;

receiving a particular document, in the plurality of the registered digital documents, to be de-registered in response to an expiration of a time interval associated with an initial registration of the particular document;

calculating a set of signatures associated with the received particular document;

identifying, in the signatures stored in the signature database, at least one signature included in the set of calculated signatures; and removing from the signature database the at least one identified signature included in the set of calculated signatures associated with the particular document, wherein data in the network traffic detected to include a signature of a registered document is intercepted and data in the network traffic determined to not include a signature of a registered document is allowed to propagate unintercepted to its intended destination.

15. The machine-readable medium of claim 14, wherein the document to be de-registered has exceeded a temporal registration threshold for the document.

16. A non-transitory machine-readable medium storing data representing instructions that, when executed by a processor, cause the processor to perform operations comprising:

monitoring security of a plurality of registered digital documents in a system using a capture system, the monitoring including determining whether signatures associated with the registered digital documents are included in data propagating in network traffic of the system, wherein the signatures of the registered documents are maintained in a signature database, each signature being associated with at least one of the plurality of registered digital documents, and respective signatures are removed from the database upon determining that respective signatures are detected within the network traffic at a rate in excess of a threshold detection rate designated as a threshold percentage of all data objects detected in the network traffic;

receiving a request to de-register an identified document from the plurality of registered digital documents in response to an expiration of a time interval associated with an initial registration of the identified document;

de-registering the identified document by removing all signatures associated with the identified document from the signature database; and allowing an attempt to forward the identified document to a particular network destination subsequent to the de-registering of the identified document, wherein the detection of one or more of the signatures of the registered documents in particular data propagating in network traffic prompts interception of the particular data.

17. The machine-readable medium of claim 16, wherein the request identifies the identified document by a unique name.

18. The machine-readable medium of claim 16, wherein the instructions further cause the processor to determine that the identified document exceeds a temporal registration threshold.

19. A non-transitory machine-readable medium storing data representing instructions that, when executed by a processor, cause the processor to perform operations comprising:

monitoring security of a plurality of registered digital documents in a system, the monitoring including determining whether signatures associated with the registered digital documents are included in data propagating in network traffic of the system, wherein the signatures of the registered documents are maintained in a signature database, each signature being associated with at least one of the plurality of registered digital documents, wherein respective signatures are removed from the database after determining that the respective signatures are detected within the network traffic at a rate in excess of a threshold detection rate, which is designated as a threshold percentage of data objects detected in the network traffic;

identifying at least one redundant signature maintained in the signature database, wherein a redundant signature is a signature shared by multiple different digital documents in the plurality of registered digital documents; and removing the at least one redundant signature from the signatures maintained in the signature database;

identifying a particular document in the plurality of digital documents that is to be deregistered; and de-registering the particular document by removing all signatures associated with the particular document from the signature database;

wherein registered data that is detected as including a signature of at least one of the plurality of registered digital documents is intercepted prior to its intended destination and data that is detected as not including a signature of at least one of the plurality of registered digital documents is allowed to be forwarded to its intended destination at a network node.

20. The machine-readable medium of claim 19, wherein identifying the set of redundant signatures comprises identifying a plurality of identical signatures.

21. The machine-readable medium of claim 19, wherein identifying the set of redundant signatures comprises identifying a threshold number of identical signatures associated with a threshold number of different registered documents.

22. The machine-readable medium of claim 14, wherein the threshold detection rate of the particular signature further includes a number of times the particular signature is generated from data objects detected in the network traffic during a time window.

23. The machine-readable medium of claim 22, wherein the threshold detection rate of the particular signature further includes a rate of signature appearance per day.

24. A non-transitory machine-readable medium storing data representing instructions that, when executed by a processor, cause the processor to perform operations comprising:

providing a database of stored signatures, each signature being associated with one of a plurality of registered documents, wherein a particular signature is removed from the signature database based on identifying that the particular signature was detected within network traffic of a particular network in excess of a threshold detection rate designated as a threshold percentage of all data objects detected in the network traffic;

monitoring security of the plurality of registered documents, the monitoring including identifying attempts to forward registered documents to nodes outside of the particular network by identifying data propagating within the particular network that includes one or more signatures maintained in the signature database and associated with the plurality of registered documents;

receiving a selected document, included in the plurality of registered documents, that is to be de-registered in response to an expiration of a time interval associated with an initial registration of the selected document; and de-registering the selected document by removing all signatures associated with the selected document from the signature database;

wherein data propagating within the particular network that is detected as not including a signature of at least one of the plurality of registered digital documents is allowed to be forwarded outside of the particular network.

25. The machine-readable medium of claim 24, wherein the set of signatures comprises signatures generated from unparsable source text.

26. The machine-readable medium of claim 24, wherein the set of signatures comprises signatures generated from source text appearing on a signature blacklist.

27. An apparatus to be used in an electronic environment in which network communications occur involving packets and at least one processor and a memory element, comprising:

a network interface module to connect the apparatus to a network;

a storage medium including a signature database storing a plurality of signatures, each signature being associated with one of a plurality of registered digital documents, wherein a particular signature is removed from the signature database based on identifying that a detection rate, which reflects how often the particular signature is detected in particular captured objects propagating in network traffic, exceeds and over inclusive signatures are removed from the signature database upon determining that respective signatures are detected within the network traffic at a rate in excess of a threshold detection rate designated as a threshold percentage of all data objects detected in the network traffic;

a user interface to receive a particular digital document to be de-registered in response to an expiration of a time interval associated with an initial registration of the particular document; and a registration module comprising:

a registration engine to generate a set of signatures associated with the received particular document, and a search engine to identify signatures in the signature database matching any of the signatures in the set of signatures associated with the received particular document, wherein the registration module is configured to remove the signatures matching any of the signatures in the set of signatures associated with the received particular document form the signature database;

wherein data in the network traffic detected to include at least one of the plurality of signatures associated with at least one registered document is intercepted and data in the network traffic determined to not include at least one of the plurality of signatures is allowed to propagate unintercepted to its intended destination.

28. The apparatus of claim 27, wherein the threshold detection rate of the particular signature further includes a number of times the particular signature is generated from data objects detected in the network traffic during a time window.

29. The apparatus of claim 28, wherein the threshold detection rate of the particular signature further includes a rate of signature appearance per day.

30. An apparatus to be used in an electronic environment in which network communications occur involving packets and at least one processor and a memory element, comprising:

a storage medium including a signature database to store a plurality of signatures, each signature being associated with one of a plurality of registered documents, wherein a particular signature is removed from the signature database based on identifying that the particular signature was detected within network traffic of a particular network in excess of a threshold detection rate designated as a threshold percentage of all data objects detected in the network traffic;

a security monitor to monitor security of the plurality of registered documents, the monitoring including identifying attempts to forward registered documents to nodes outside of the particular network by identifying data propagating within the particular network that includes one or more signatures maintained in the signature database and associated with the plurality of registered documents; and a registration module to maintain the signature database by removing a set of signatures from the database based on identification of a selected document to be de-registered in response to an expiration of a time interval associated with an initial registration of the selected document, and wherein data propagating within the particular network that is detected as not including a signature of at least one of the plurality of registered digital documents is allowed to be forwarded outside of the particular network.

31. The apparatus of claim 30, wherein the set of signatures comprises signatures generated from unparsable source text.

32. The apparatus of claim 30, wherein the set of signatures comprises signatures generated from source text appearing on a signature blacklist.

* * * * *